(12) United States Patent
Al-Ani et al.

(10) Patent No.: US 9,981,218 B2
(45) Date of Patent: May 29, 2018

(54) NANOPARTICLE PURIFYING SYSTEM

(71) Applicants: Ma'An Nassar Raja Al-Ani, Tampa, FL (US); Mujibullah Sasthaa Begum, Coimbatore (IN)

(72) Inventors: Ma'An Nassar Raja Al-Ani, Tampa, FL (US); Mujibullah Sasthaa Begum, Coimbatore (IN)

( * ) Notice: Subject to any disclaimer, the term of this patent is extended or adjusted under 35 U.S.C. 154(b) by 308 days.

(21) Appl. No.: 14/956,339

(22) Filed: Dec. 1, 2015

(65) Prior Publication Data

US 2017/0151528 A1    Jun. 1, 2017

(51) Int. Cl.
*B01D 53/02* (2006.01)
*B01D 53/04* (2006.01)

(52) U.S. Cl.
CPC ...... *B01D 53/0407* (2013.01); *B01D 2251/20* (2013.01); *B01D 2251/304* (2013.01); *B01D 2253/102* (2013.01); *B01D 2258/0283* (2013.01); *B01D 2258/06* (2013.01); *B01D 2259/4583* (2013.01)

(58) Field of Classification Search
CPC .......... B01D 2251/20; B01D 2251/304; B01D 2253/102; B01D 2258/0283; B01D 2258/06; B01D 2259/84583; B01D 53/0407
See application file for complete search history.

(56) References Cited

U.S. PATENT DOCUMENTS

| 2,038,071 | A |   | 4/1936  | Wilhelm |
|-----------|---|---|---------|---------|
| 2,565,458 | A |   | 8/1951  | Weisz   |
| 2,969,127 | A | * | 1/1961  | Cook ..................... B01D 46/12 55/483 |
| 3,217,471 | A |   | 11/1965 | Silverman |
| 3,412,530 | A | * | 11/1968 | Cardiff ..................... B03C 3/32 126/299 D |

(Continued)

FOREIGN PATENT DOCUMENTS

| CN | 103830964 A | 6/2014 |
| DE | 203 13 235 U1 | 2/2004 |

(Continued)

OTHER PUBLICATIONS

"*Appliance Filters*," D Mark® http://www.dmarkinc.com/appliance-filters.html (Last Accessed on Jan. 14, 2015) 2 pgs.

*Primary Examiner* — Christopher P Jones
(74) *Attorney, Agent, or Firm* — Richard C. Litman

(57) ABSTRACT

The nanoparticle purifying system includes a container having an interior portion including a plurality of aluminum plates. Each of the plurality of aluminum plates includes a solid filtering agent, such as activated charcoal and, optionally, sodium tetra borate. The container can further include an inlet for receiving polluted air, an outlet for discharging purified air, and a pathway extending between the plurality of aluminum plates from the inlet to the outlet. The nanoparticle purifying system includes a removable lid for disposing on the container. Each of the plurality of aluminum plates can include an adhesive, such as hot glue and/or carpet glue, for attaching the solid filtering agent to the surfaces of the plurality of aluminum plates and interior surfaces of the container.

10 Claims, 3 Drawing Sheets

(56) References Cited

U.S. PATENT DOCUMENTS

| | | | |
|---|---|---|---|
| 3,522,172 A * | 7/1970 | Hahn | G01N 30/38 |
| | | | 210/198.2 |
| 3,839,847 A | 10/1974 | Banikiotes et al. | |
| 4,104,192 A * | 8/1978 | Yoshikawa | A23L 3/358 |
| | | | 252/188.22 |
| 4,227,904 A | 10/1980 | Kasmark, Jr. | |
| 4,717,401 A * | 1/1988 | Lupoli | B01D 53/0446 |
| | | | 96/141 |
| 5,993,521 A * | 11/1999 | Loreth | B03C 3/12 |
| | | | 96/69 |
| 7,025,006 B2 | 4/2006 | Jeulin | |
| 7,172,645 B1 * | 2/2007 | Pfister | B01D 53/02 |
| | | | 95/116 |
| 2002/0108497 A1 | 8/2002 | Wong | |
| 2003/0229131 A1 | 12/2003 | Sessler et al. | |
| 2004/0045437 A1 * | 3/2004 | Chang | B01D 53/0407 |
| | | | 95/134 |
| 2007/0157813 A1 * | 7/2007 | Spiegel | B03C 3/32 |
| | | | 96/15 |
| 2010/0050869 A1 * | 3/2010 | Gadkaree | B01D 53/0423 |
| | | | 95/134 |
| 2010/0282083 A1 | 11/2010 | Edwards | |
| 2011/0056382 A1 | 3/2011 | Lackner | |
| 2011/0120101 A1 | 5/2011 | Kirsch | |
| 2012/0071703 A1 | 3/2012 | Martin et al. | |
| 2012/0170009 A1 * | 7/2012 | Katsura | B01D 53/0415 |
| | | | 355/30 |
| 2012/0204724 A1 * | 8/2012 | Angelini | A62B 29/00 |
| | | | 96/121 |
| 2012/0241391 A1 | 9/2012 | Carlson et al. | |
| 2012/0255444 A1 * | 10/2012 | Kim | B03C 3/41 |
| | | | 96/98 |
| 2013/0055899 A1 * | 3/2013 | Makino | B01D 53/04 |
| | | | 96/112 |
| 2017/0072361 A1 * | 3/2017 | Yoon | B01D 53/1425 |

FOREIGN PATENT DOCUMENTS

| | | |
|---|---|---|
| EP | 1 529 562 A1 | 5/2005 |
| JP | 7-8804 | 1/1995 |
| KR | 10-2007-0010735 | 1/2007 |
| KR | 10-2009-0061228 | 6/2009 |
| KR | 10-2011-0112497 | 10/2011 |

* cited by examiner

NANOPARTICLE PURIFYING SYSTEM

BACKGROUND OF THE INVENTION

1. Field of the Invention

The present invention relates to purifying/filtering systems, and particularly to a system for purifying waste gases or air.

2. Description of the Related Art

Purification of polluted air, smoke, and nuclear waste is becoming increasingly vital for protection of our environment and our health. Many facilities release smoke into the atmosphere that is produced by burning fuel. The composition of the smoke can vary depending on the nature of the burning fuel and the conditions of combustion. For example, high temperatures can lead to the production of nitrogen oxides. Burning a product having sulfur can lead to the production of sulfur dioxide or even hydrogen sulfide in the case of incomplete combustion. While carbon and hydrogen are typically oxidized into carbon dioxide and water, the nitrogen oxide, sulfur dioxide, and hydrogen sulfide are released into the environment, contaminating the air, water, and soil. Further, it was discovered that Uranium Hexafluoride, a highly toxic compound, escapes nuclear facilities. Air, water, and soil polluted by such facilities can significantly impact our lives.

Thus, a nanoparticle purifying system solving the aforementioned problems is desired.

SUMMARY OF THE INVENTION

The nanoparticle purifying system includes a container having an interior portion, a plurality of aluminum plates in the interior portion, and a solid filtering agent, such as activated charcoal, on the plurality of aluminum plates. The activated charcoal can be combined with sodium tetra borate. The container further includes an inlet configured for receiving polluted air, an outlet configured for discharging purified air, such as substantially purified air, and a pathway extending between the inlet and the outlet. The system can also include a removable lid for sealing the container.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
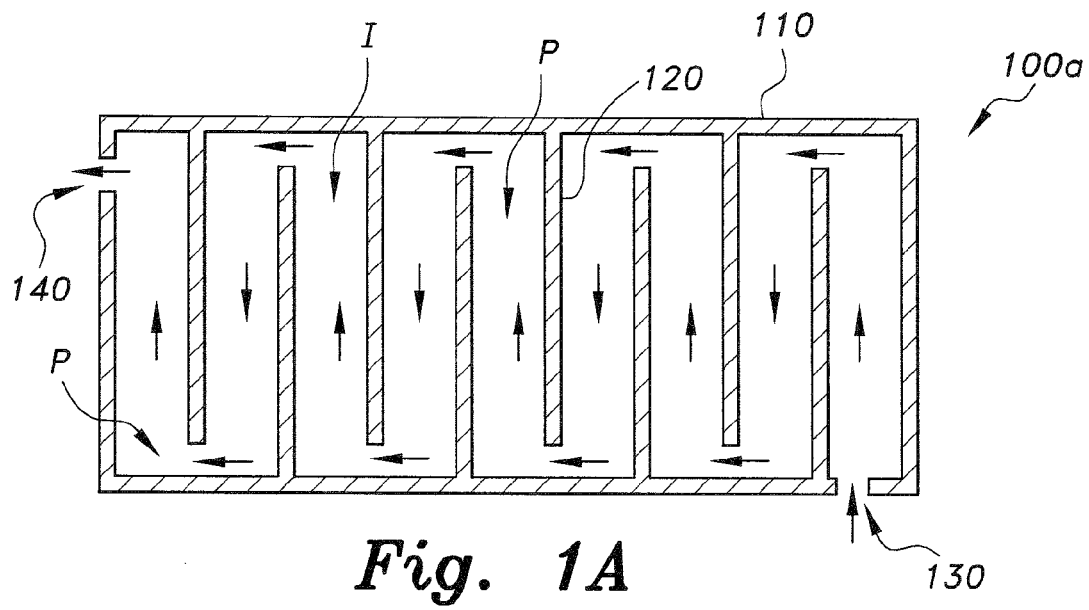
FIG. 1A is a planar view of a nanoparticle purifying system, according to the present invention.
Figure 1B:
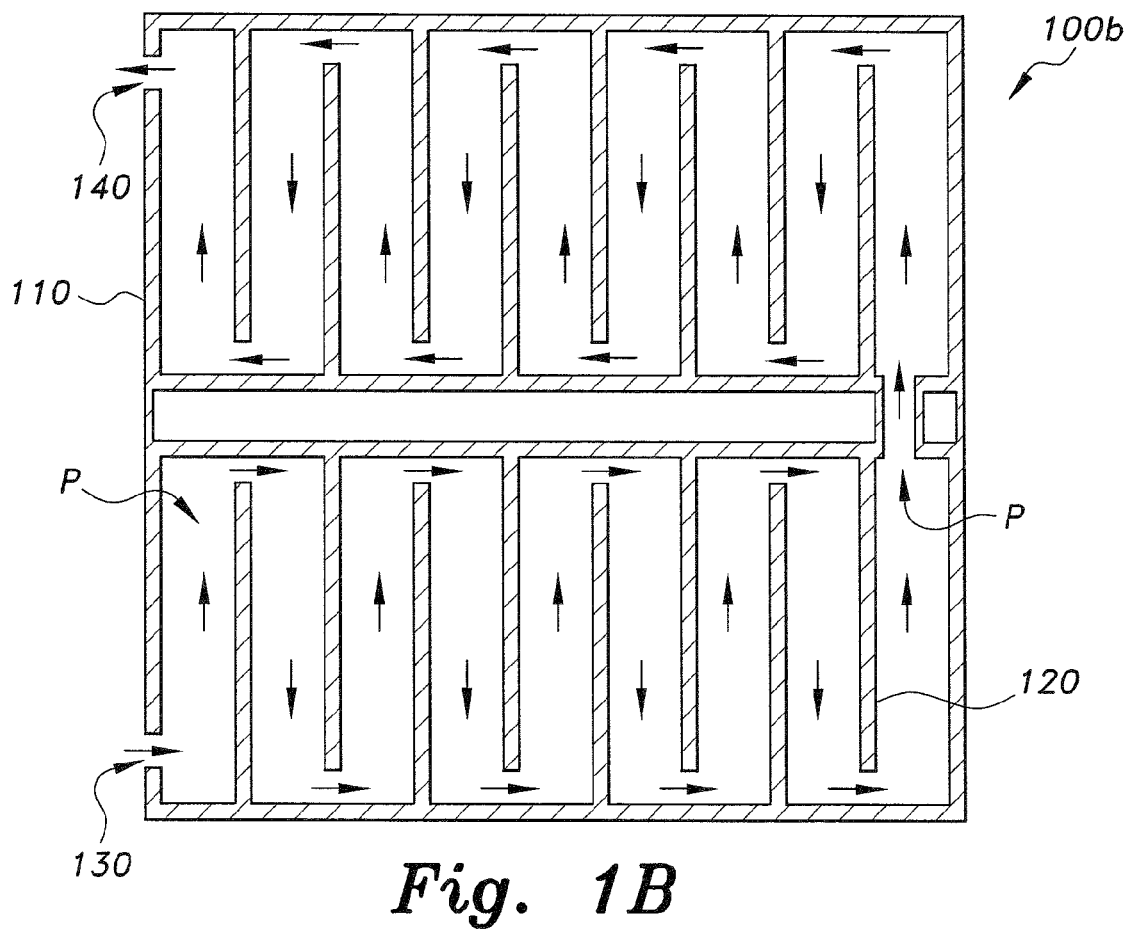
FIG. 1B is a planar view of a nanoparticle purifying system including a plurality of containers, according to the present invention.
Figure 2:
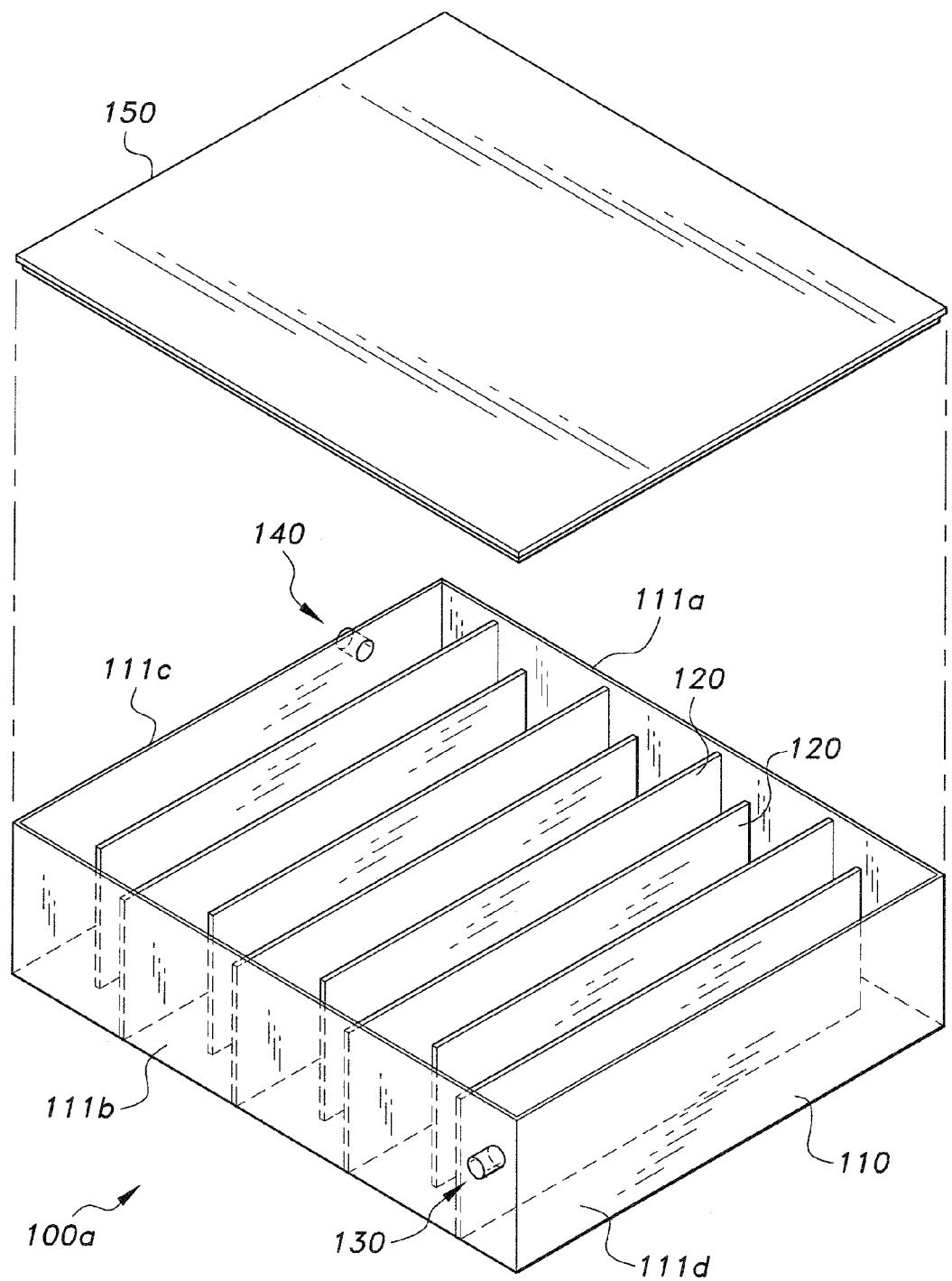
FIG. 2 is a perspective view of a nanoparticle purifying system including a container having a removable lid, according to the present invention.
Figure 3:
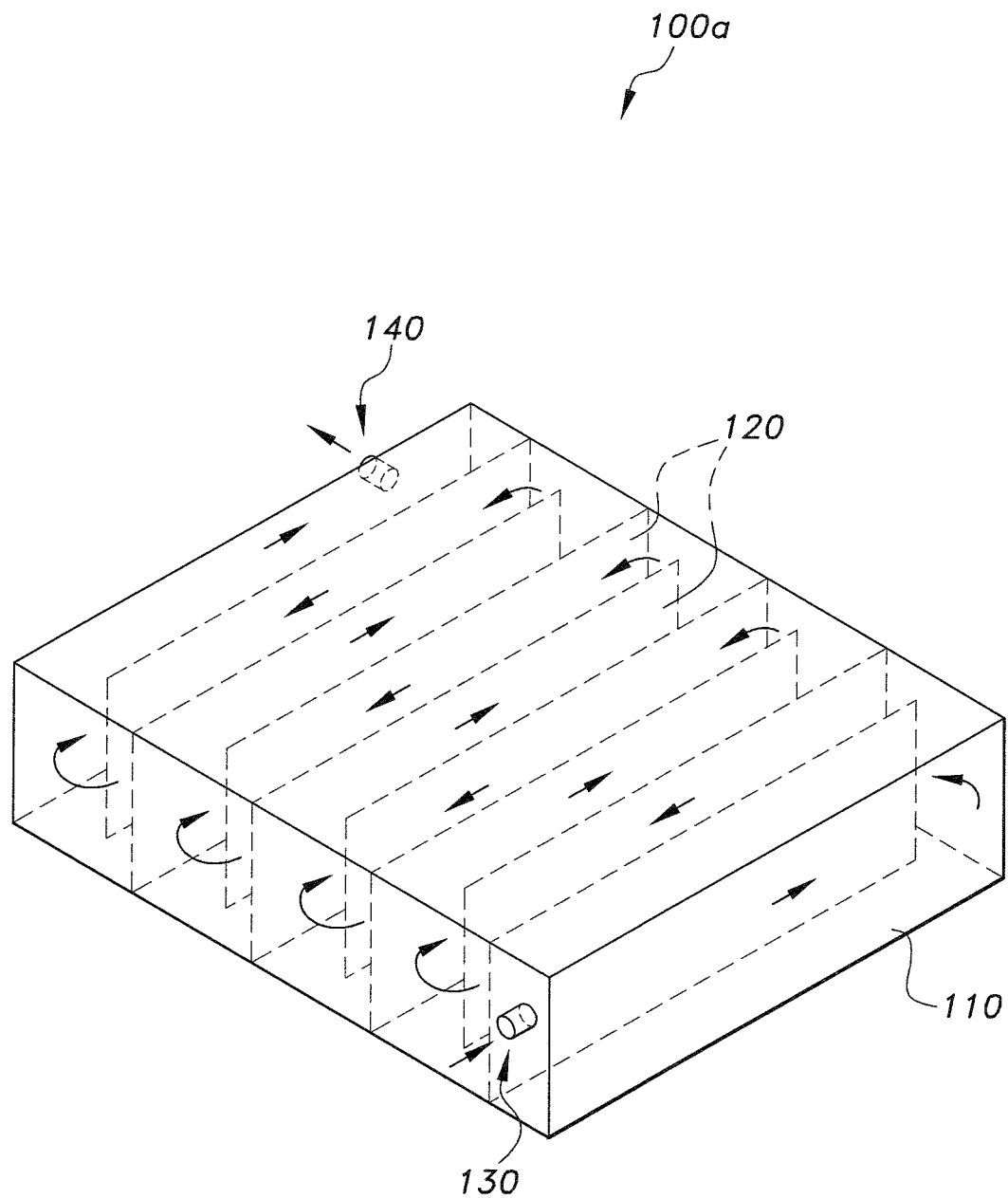
FIG. 3 is a schematic view of a nanoparticle purifying system according to the present invention.

Referring to FIGS. 1 through 3, a nanoparticle purifying system 100a is generally illustrated. The nanoparticle purifying system 100a includes a container 110, a plurality of aluminum panels or plates 120 disposed in the container, and a solid filtering agent disposed on surfaces of the aluminum plates 120 and the container 110. The container 110 has a peripheral frame surrounding an interior portion I. The peripheral frame can be formed by a pair of parallel, opposing sidewalls 111a, 111b, and a pair of parallel, opposing endwalls 111c, 111d, which extend between and connect the opposing sidewalls 111a, 111b. The container 110 includes an inlet 130 configured for receiving polluted air, an outlet 140 configured for discharging purified air, and a pathway P extending from the inlet 130 to the outlet 140. The nanoparticle purifying system 100a can include a removable lid 150 for disposing on the peripheral frame of the container 110 to seal the container. It is to be noted that, as illustrated in FIG. 1B, the nanoparticle purifying system 100b can include more than one container 110, such as two containers 110.

The container 110 can be formed from any suitable type of material. The container 110 can be formed from a metal, e.g., aluminum, which can withstand temperatures of up to 630° C. Further, the container 110 can have any suitable configuration, size, and volume. For example, the container 110 can be cube-shaped, having dimensions of 32.6 cm×26.3 cm×10.1 cm, and a volume of 9722.06 cm$^3$. The container 110 can be configured to fit into smoke outlets or other outlets of factories, oil and gas facilities, nuclear facilities, or other facilities from which pollutants are discharged into the air. The nanoparticle purifying system 110a can purify polluted air, smoke, and nuclear waste. It is to be noted that the configuration and the dimensions of the container 110 can vary depending on the facilities in which the nanoparticle purifying system 110a, 100b will be used.

The container 110 can house any number of aluminum plates 120 depending on the facility, how the nanoparticle purifying system 100a, 100b will be used, the amount of polluted air that needs to be purified, and the rate at which the polluted air needs to be purified. Each of the plurality of aluminum plates 120 can have any suitable thickness, such as 1 cm, and can be positioned within the interior portion I of the container 110 in any suitable configuration.

Preferably, each of the plurality of aluminum plates 120 are spaced from and disposed parallel to other aluminum plates 120 and endwalls 111c and 111d. Each of the plurality of aluminum plates 120 are in contact with one of the two sidewalls 111a and 111b and spaced from another one of the two sidewalls 111a and 111b. For example, adjacent ones of the aluminum plates 120 are in contact with a different one of the sidewalls 111a, 111b. Alternate ones of the aluminum plates 120 are in contact with the same sidewall. A gap or space formed between each of the aluminum plates 120 and between each aluminum plates 120 and one of the sidewalls 111a or 111b forms a continuous pathway P through which polluted gases can travel.

The removable lid 150 of the container 110 can be removed, such as after each use, to allow a user to recoat each of the plurality of aluminum plates 120 with the solid filtering agent as needed. Further, each of the plurality of aluminum plates 120 can be detachable from the container 110. For example, they can be removed from the container 110 to be cleaned and/or recoated with the solid filtering agent.

The surfaces of each of the plurality of aluminum plates 120, as well as the interior surface of the container 110 exposed to the polluted air can be non-smooth or roughened, to facilitate better retention of the solid filtering agent on the surfaces of the container 110 and the aluminum plates 120. For example, the rough surfaces can provide pockets in which the solid filtering agent particles can be retained. The solid filtering agent can thereby adhere to the surfaces of the container 110 and the aluminum plates 120 more readily than if the surfaces were smooth.

Adhesives, e.g., hot glue or carpet glue, can also be used to attach the solid filtering agent to each of the plurality of aluminum plates 120. It is to be noted that different adhesives and/or techniques can be used to attach the solid filtering agent to the surfaces of each of the plurality of aluminum plates 120 and to the interior surfaces of the container 110 depending on the intended use of the nanoparticle purifying system 110a, 110b, the temperature of the facility, the moisture content, and the quantity/type of the impurity to be removed. The amount of solid filtering agent used can also vary depending on the facility, type of use, and the amount of polluted air.

The solid filtering agent can be any suitable type of solid filtering agent, such as activated charcoal. The activated charcoal can be combined with silica gel, e.g., when the moisture content of the harmful gases is high. The activated charcoal particles have a diameter that ranges between 0.15 mm and 0.25 mm and a length that is less than 1 mm. The adsorption of the gas molecules by the activated charcoal can be physical adsorption. Physical forces, such as London dispersion forces or Vander Waals forces generally operate between the adsorbent and the adsorbate. For example, when gas is passed through the activated charcoal, the adsorbate molecules adsorb into the pores of the activated charcoal. This process of adsorption can be exothermic, e.g. heat producing, due to the increased ordering of the adsorbate on the adsorbent surface, thereby reducing entropy ($\Delta G = \Delta H - T\Delta S$). It is to be noted that this process of adsorption can increase with decreasing temperature or with increasing pressure.

If the polluted air includes nuclear waste, the solid filtering agent can include sodium tetra borate in addition to activated charcoal. The sodium tetra borate can immobilize sulfate in high level nuclear waste (HLW) and low level nuclear waste (LLW).

By way of operation, surfaces of the interior portion I of the container 110, as well as surfaces of the plurality of aluminum plates 120 is coated with the solid filtering agent. Then, the removable lid 150 is closed to prevent any polluted air from escaping into the atmosphere prior to being purified by the nanoparticle purifying system 100a, 100b. Smoke from a burnt substance or from a smoke outlet, such as a smoke stack, can then enter the container 110 through the inlet 130. As the polluted air travels through the pathway P created by each of the plurality of aluminum plates 120, the solids and harmful substances can get adsorbed by the solid adsorbing agent(s) attached to the surfaces of each of the plurality of aluminum plates 120 and to the interior surfaces of the container 110 so as to purify the polluted air traveling through the pathway P. The purified air can then be discharged through the outlet 140 of the container 110 into the atmosphere.

As discussed above, a user can connect more than one container 110, as illustrated in FIG. 1B, to provide for additional aluminum plates 110 and, in turn, a longer pathway P for the polluted air to travel through. Having additional aluminum plates 120 and a longer pathway P can increase the amount of pollutants that can be removed from the polluted air. The nanoparticle purifying system 100b having a second container 110 can adsorb an increased amount of pollutants, such as harmful gases and nuclear waste, from the polluted air since a second container 110 can facilitate the removal of any trace amounts of pollutants that can remain in the air after that polluted air has traveled through the pathway P in the first container 110.

Accordingly, the number of containers 110 and the number of aluminum plates 120 can vary depending on the circumstances, such as the type and quantity of polluted air that is to be purified. For example, the nanoparticle purifying system 100a having a single container 110 can be used for the exhaust system of a car, while the nanoparticle purifying system 100b having two containers 110 can be used for a reactor discharging highly toxic and/or radioactive material, such as radioactive nanoparticles. It is to be noted that the rate at which the polluted air can be purified can be increased by increasing the pressure of the polluted air prior to allowing the polluted air to enter into the container 110 through the inlet 130 and by allowing the polluted air to expand through a valve (not shown) prior to flowing into the inlet 130.

The present inventors tested a nanoparticle purifying system configured according to the present teachings. The container of the nanoparticle purifying system included a container having dimensions of 32.6 cm×26.3 cm×10.1 cm. The volume of the container was 9722.06 cm$^3$. The aluminum plates used were 1 cm thick. Six detachable aluminum plates were disposed inside the container. About 250 g of activated charcoal was applied on the inner surfaces of the container and on the aluminum plates. The container was then closed with the removable lid. Smoke from a burnt substance was allowed to enter through the inlet of the container for one minute. After 3 minutes and 43 seconds, harmful substances in the smoke were adsorbed in the container, and purified air was emitted from the container. When the lid of the container was removed, there was no trace of smoke. This confirms the complete removal of harmful substances from the smoke.

It is to be understood that the present invention is not limited to the embodiments described above, but encompasses any and all embodiments within the scope of the following claims.

We claim:

1. A nanoparticle purifying system, comprising:
a container, the container including a peripheral frame, wherein the frame comprises a pair of parallel, opposing sidewalls, a pair of parallel, opposing endwalls extending between and connecting the opposing sidewalls, a bottom surface and a top surface defining an interior space, a plurality of spaced, parallel aluminum plates disposed within the peripheral frame, wherein adjacent ones of the plates are in contact with a different one of the sidewalls, a solid filtering agent on the plurality of aluminum plates, an inlet configured for receiving polluted air and located along one of the sidewalls, an outlet configured for discharging purified air and located along one of the endwalls furthest from the inlet, and a continuous, serpentine pathway extending from the inlet to the outlet, the continuous, serpentine pathway formed by spaces between the plurality of aluminum plates and between the plurality of aluminum plates and the pair of sidewalls; and
a removable lid disposed on the top surface.

2. The nanoparticle purifying system according to claim 1, wherein the plurality of aluminum plates comprises a plurality of detachable aluminum plates.

3. The nanoparticle purifying system according to claim 1, wherein each of the plurality of aluminum plates further comprises roughened surfaces.

4. The nanoparticle purifying system according to claim 1, wherein the solid filtering agent comprises activated charcoal.

5. The nanoparticle purifying system according to claim 4, wherein the solid filtering agent comprises sodium tetra borate.

6. The nanoparticle purifying system according to claim 4, wherein the activated charcoal is in particulate form and includes granules having a diameter of from about 0.15 mm to about 0.25 mm.

7. The nanoparticle purifying system according to claim 6, wherein the length of the activated charcoal granules is less than 1 mm.

8. The nanoparticle purifying system according to claim 4, further comprising silica gel.

9. The nanoparticle purifying system according to claim 4, wherein each of the plurality of aluminum plates includes an adhesive configured for attaching the solid filtering agent to each of the plurality of aluminum plates.

10. The nanoparticle purifying system according to claim 9, wherein the adhesive is selected from the group consisting of carpet glue and hot glue.

\* \* \* \* \*